J. Maxheimer.
Bird Cage.
Nº 88,654. Patented Apr. 6, 1869.
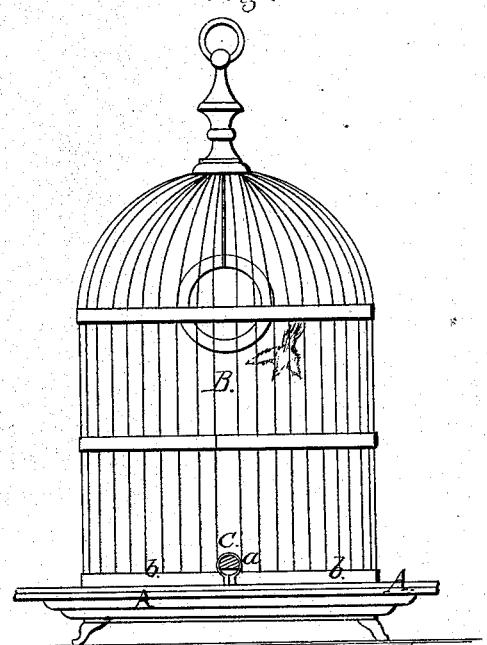
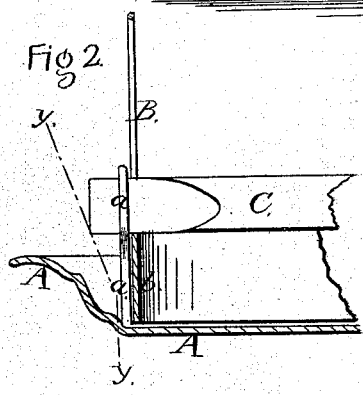
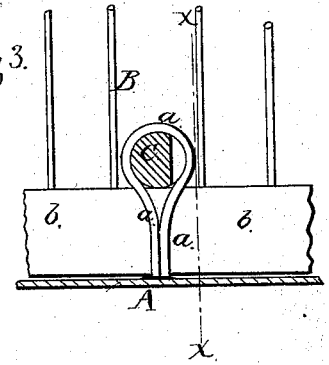
Witnesses:
Chas. Nida
John F. Brooks
Inventor:
J. Maxheimer
per Munn & Co.
Attorneys

J. MAXHEIMER, OF NEW YORK, N. Y.

Letters Patent No. 88,654, dated April 6, 1869.

IMPROVED BIRD-CAGE.

The Schedule referred to in these Letters Patent and making part of the same.

*To all whom it may concern:*

Be it known that I, J. MAXHEIMER, of New York, in the county of New York, and State of New York, have invented a new and improved Bird-Cage; and I do hereby declare that the following is a full, clear, and exact description thereof, which will enable others skilled in the art to make and use the same, reference being had to the accompanying drawings, forming part of this specification, in which—

Figure 1 represents a side view of my improved bird-cage.

Figure 2 is a detail vertical longitudinal section, on an enlarged scale, of the same, the plane of section being indicated by the line $x\,x$, fig. 3.

Figure 3 is a detail vertical transverse section of the same, taken on the plane of the line $y\,y$, fig. 2.

Similar letters of reference indicate corresponding parts.

This invention relates to a new manner of connecting the top of a bird-cage to the bottom of the same, with a view of utilizing material, and of obtaining a better fastening.

The invention consists in the application of a rod, which is fitted through an eye, or loop projecting from the bottom, and which rests on the upper edge of a band, or ring of the cage-top.

This rod is not only a secure and economical fastening for the bottom, but forms, at the same time, a step, or support for the bird.

A, in the drawing, represents the bottom of a bird-cage, of ordinary or suitable form.

B is the top of the same.

From the bottom projects, either at the bottom, or at each end, a wire or plate, $a$, forming an eye, or loop, as shown in fig. 3.

A rod, C, can be fitted through this eye, or through the eyes, and rests, at the same time, on the upper edge of the lower band, or ring $b$ of the cage-top, as is clearly indicated in fig. 2.

The height of the eye or eyes $a$ is such, that the rod will be clamped between their upper inner edges and the top edge of the ring $b$.

The ends of the rod, or those portions of the same may be flattened, or cam-shaped, so that they can be easily introduced through the eyes, in the position shown in fig. 1, and then be turned, as in fig. 3, to be clamped.

The rod C is sufficiently elevated above the bottom of the cage to be a stepping-bar for the bird.

I am aware of the patent granted to G. Günther, January 5, 1869, but I claim nothing therein shown, as my invention.

Having thus described my invention,

I claim as new, and desire to secure by Letters Patent—

Securing the bottom, A, to the top, B, of the bird-cage, by means of the eyes, or loops $a$, upon opposite sides of the bottom, and the bar C, whose ends fit within said eyes, resting upon the band $b$, and which passes transversely through the cage, to form a perch for the bird, as herein shown and described.

J. MAXHEIMER.

Witnesses:
FRANK BLOCKLEY,
ALEX. F. ROBERTS.